Patented May 1, 1928.

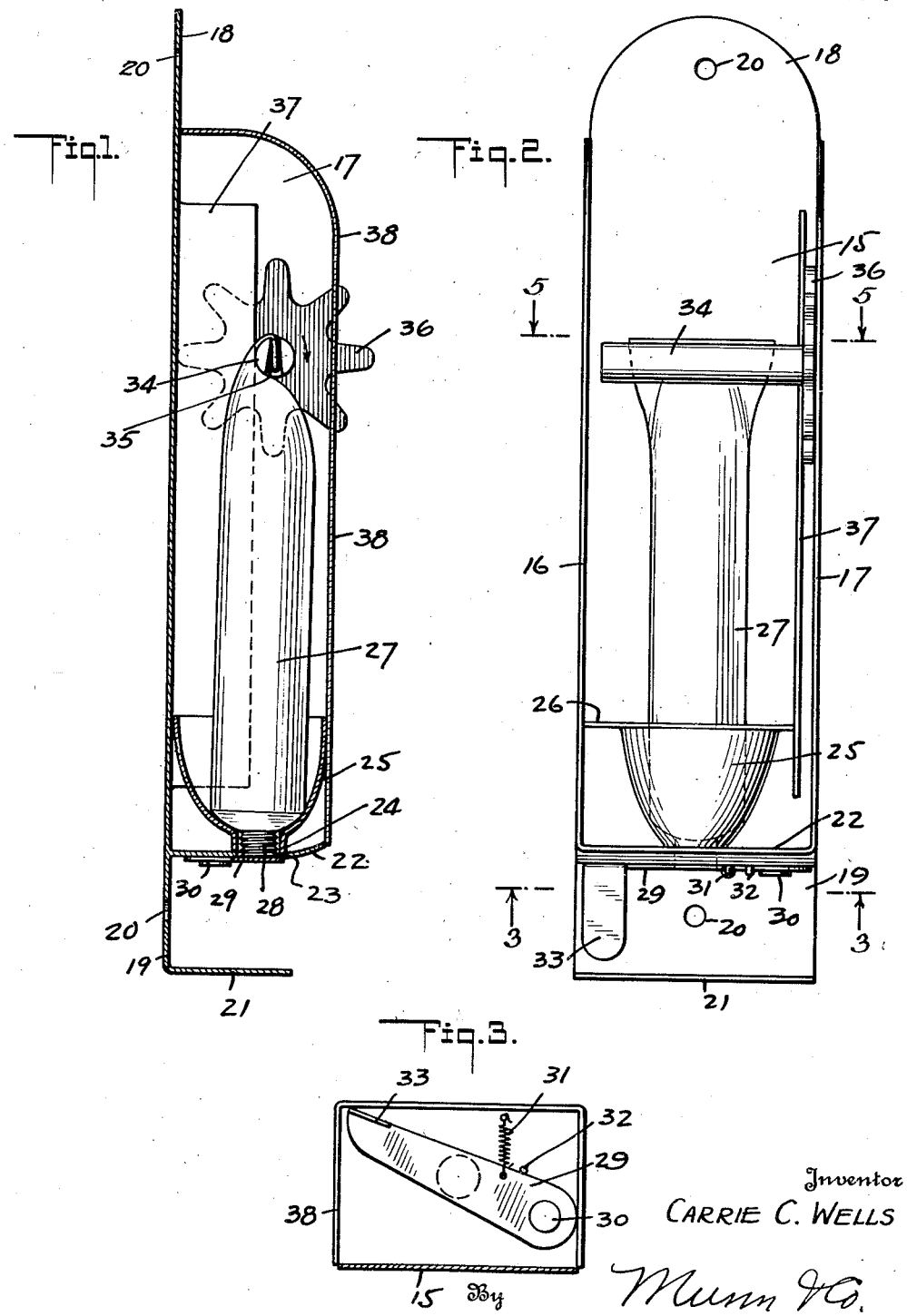

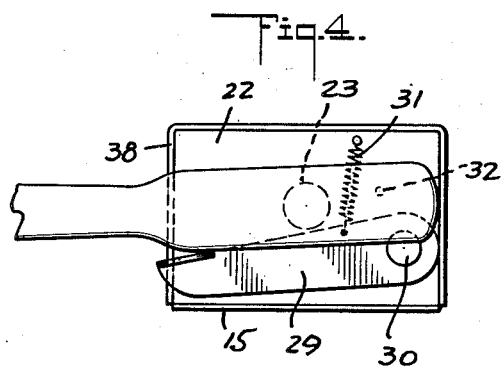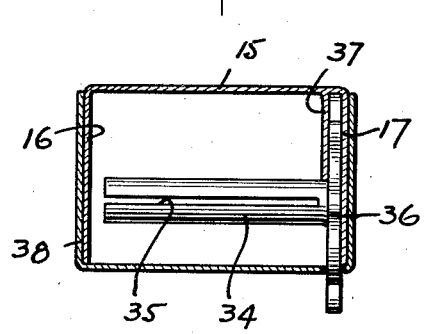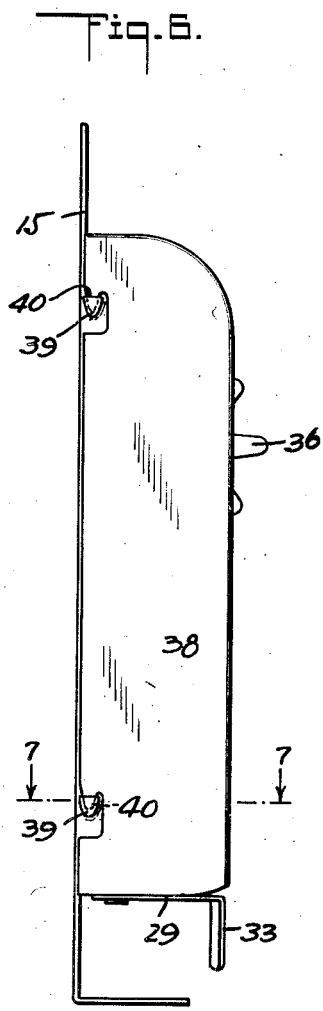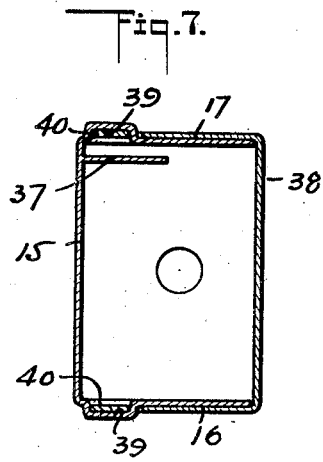

1,668,296

UNITED STATES PATENT OFFICE.

CARRIE C. WELLS, OF HERMOSA BEACH, CALIFORNIA.

DISPENSING DEVICE FOR PASTE TUBES.

Application filed June 1, 1926. Serial No. 113,043.

My invention relates to and has for its purpose the provision of a simple and inexpensive device capable of receiving collapsible tubes for tooth paste, paints and the like, of various diameters and lengths, and operable to compress a paste tube so that the paste can be dispensed as desired.

My invention is particularly designed, although not necessarily, for the dispensing of paste from tooth paste tubes, and in this adaptation the device serves as a container for the tube and to permit the dispensing of the paste therefrom without wasting and without contaminating the hands.

I will describe only one form of dispensing device for paste tubes embodying my invention, and will then point out the novel features thereof in claims.

In the drawings:

Figure 1 is a view showing in vertical section one form of dispensing device embodying my invention;

Figure 2 is a view showing the dispensing device in front elevation, with the cover removed;

Figure 3 is a transverse sectional view taken on the line 3—3 of Figure 2;

Figure 4 is a bottom plan view of the device shown in the preceding views, with a tooth brush in applied position thereto;

Figure 5 is a transverse sectional view taken on the line 5—5 of Figure 2;

Figure 6 is a view showing the complete device in side elevation;

Figure 7 is a transverse sectional view taken on the line 7—7 of Figure 6.

Similar reference characters refer to similar parts in each of the several views.

Referring specifically to the drawings, my invention in its present embodiment comprises a container having a back plate 15 and side flanges 16 and 17 extending forwardly from the longitudinal edges of the plate and terminating short of the ends of the plate so that there is provided at the upper end of the plate an attaching lip 18 and at the lower end an attaching lip 19. Both of the lips are provided with openings 20 to receive nails or other wall projections by which the entire device as a unit may be supported upon the wall. The lower lip 19 is bent forwardly to provide a horizontal extension 21, the purpose of which will be described hereinafter.

The side flanges 16 and 17 are connected at their lower ends by a bottom flange 22 having therein an opening 23 surrounded by the reduced end 24 of a cup shaped member 25 disposed within the container and secured to transverse strips 26. This cup shaped member 25 is of substantially frustoconical form and is designed to receive the nozzle end of a paste tube indicated at 27, and in such manner as to center the tube within the container and to cause the nozzle 28 thereof to be disposed within the restricted end 24, whereby the paste tube will be supported in upright position within the container.

To seal the nozzle of the paste tube when paste is not being dispensed therefrom, an arm 29 is pivoted at the point indicated at 30 on the bottom flange 22, and as shown in Figure 3 this arm is normally urged by means of a spring 31 against a stop pin 32 in which position the arm covers the nozzle of the tube. The arm may be moved to the position shown in Figure 4, in which the nozzle is uncovered, and a lip or ear 33 is formed on the arm adapted to be positioned so as to be engaged by a tooth brush, as shown in Figure 4, so that by exerting a lateral pressure upon the brush the arm can be swung to such position so as to permit the bristle side of the brush to be exposed to the nozzle.

For collapsing the tube to effect the dispensing of paste therefrom, I provide a shaft 34, which is provided with a wedge shaped groove 35 adapted to receive the closed and flat end of the tube 27 and in a manner to suspend the entire tube from the shaft. Fixed to one end of the shaft is a toothed wheel 36 adapted to rotate between the flange 17 and a partition 37 secured to the back plate 15 and in parallel spaced relation to the flange. A cover 38 constitutes part of the container and when in applied position as shown in Figure 1 is adapted to conceal the paste tube, and its supporting means, but through the provision of a slot therein the teeth of the wheel 36 are exposed to allow manual manipulation of the wheel in rotating the shaft 34 to collapse the paste tube 27.

This cover 38 is removably secured upon the back plate 15 by means of sockets 39 (Figure 6) outstruck from the flanges 16 and 17 and arranged to receive heads or projections 40 on the cover 38. These sockets and projections are arranged to support the cover on the back plate against downward movement, but by elevating the cover the heads will be moved out of the sockets to allow the complete removal of the cover to provide access to the interior of the container to remove or apply a paste tube.

In practice, a tube suspended from the shaft 34 as shown in Figure 2 can be collapsed as desired by downward rotation of the wheel 36, thereby effecting a corresponding movement to the shaft 34 to wind the upper end of the tube on the shaft and to thereby compress the latter to cause ejection of paste from the nozzle. It is to be understood that when ejecting the paste a tooth brush is positioned to hold the arm 29 in the position shown in Figure 4 so as to receive the paste thereon as discharged. Should paste for any reason be discharged when the brush is not in place it will be caught by the extension 21 against falling to the floor.

An important feature of my invention is the provision of the cup shaped member 25 which functions to properly center the discharge end of paste tubes of various diameters so that the nozzles 28 will be positioned within the restricted portion 24.

Although I have herein shown and described only one form of dispensing device for paste tubes embodying my invention, it is to be understood that various changes and modifications may be made therein without departing from the spirit of the invention, and the spirit and scope of the appended claims.

I claim as my invention:

1. A dispensing device for paste tubes comprising a container having a slotted front wall, side walls, a back wall and a bottom opening adapted to receive the discharge nozzle of a paste tube inserted into the container, a partition of less width than the side walls of the container disposed adjacent one of said side walls and secured to said back wall to provide a wheel guiding and supporting channel extending lengthwise of the container in alinement with said slot, a shaft extending transversely of the partition in advance of its forward edge adapted to be engaged with the upper end of the paste tube, and a wheel fixed to the shaft and having a portion thereof extending into the channel and another portion projecting through said slot for manual manipulation to effect bodily rotation of the wheel and shaft to compress the tube and feed the latter downwardly as the tube is wound upon the shaft.

2. A dispensing device for paste in tubes comprising a container including a back plate, side plates extending forwardly from the longitudinal edges of the back plate and connected at their lower ends by a bottom flange having an opening therein surrounded by the reduced lower end of a cup shaped member secured to the container and into which the nozzle end of a paste tube is adapted to be inserted and centered so as to dispose the nozzle of the tube in the restricted end of the member and support the tube in upright position in the container, a partition secured to the back wall of the container in parallel spaced relation to one of and of less width than the side walls, a shaft in the container extending transversely across the forward edge of the partition, said shaft having a wedge shaped longitudinal slot therein open at one end and in which the closed and flat end of the tube is adapted to be received and secured, a toothed wheel secured to one end of the shaft and disposed between the partition and adjacent side wall of the container so as to support the shaft for rotary and bodily movement along the length of the container, a cover detachably secured to the side walls of the container and having a slot through which a portion of the wheel projects so as to permit manipulation of the wheel to rotate the shaft and thereby wind up and collapse the tube therein as the shaft moves downwardly to effect an ejection of paste from the tube through the opening in the bottom flange of the container.

CARRIE C. WELLS.